United States Patent [19]

VanDervort

[11] Patent Number: 5,699,346
[45] Date of Patent: Dec. 16, 1997

[54] MEASURING BURST RATE AND BURST SIZE IN ATM NETWORK VIRTUAL CONNECTIONS

[75] Inventor: Cole S. VanDervort, Frederick, Md.

[73] Assignee: Telecommunications Techniques Corporation, Germantown, Md.

[21] Appl. No.: 560,286

[22] Filed: Nov. 17, 1995

[51] Int. Cl.$^6$ ...................................... H04L 12/56
[52] U.S. Cl. ..................... 370/233; 370/253; 370/395
[58] Field of Search ..................... 370/230, 231, 370/232, 233, 234, 235, 252, 253, 389, 392, 395, 396, 400, 409, 905

[56] References Cited

U.S. PATENT DOCUMENTS

| | | | |
|---|---|---|---|
| 5,140,588 | 8/1992 | Danner | 370/253 |
| 5,179,549 | 1/1993 | Joos et al. | 370/232 |
| 5,216,669 | 6/1993 | Hofstetter et al. | 370/396 |
| 5,271,000 | 12/1993 | Engbersen et al. | 370/244 |
| 5,311,513 | 5/1994 | Ahmadi et al. | 370/230 |
| 5,313,454 | 5/1994 | Bustini et al. | 370/231 |
| 5,313,455 | 5/1994 | van der Wal et al. | 370/232 |
| 5,339,332 | 8/1994 | Kammerl | 370/253 |
| 5,343,463 | 8/1994 | van Tetering et al. | 370/253 |
| 5,343,465 | 8/1994 | Khalil | 370/253 |
| 5,390,174 | 2/1995 | Jugel | 370/392 |
| 5,402,426 | 3/1995 | Foglar et al. | 370/232 |
| 5,414,701 | 5/1995 | Shtayer et al. | 370/395 |
| 5,422,838 | 6/1995 | Lin | 365/49 |
| 5,457,700 | 10/1995 | Merchant | 370/253 |
| 5,497,375 | 3/1996 | Hluchyj et al. | 370/232 |
| 5,530,695 | 6/1996 | Dighe et al. | 370/232 |
| 5,548,581 | 8/1996 | Makrucki | 370/232 |

FOREIGN PATENT DOCUMENTS 0231967  8/1987  European Pat. Off. .

OTHER PUBLICATIONS

Tekelec Corporation, "ATM Pocket Guide", Publication No. 908–0119–01, Revision B, Jul. 1994.

*Primary Examiner*—Alpus H. Hsu
*Attorney, Agent, or Firm*—Michael de Angeli; Philip Florenzo

[57] ABSTRACT

A test instrument for measuring the rate and size of bursts of cells received at a given node of an ATM network with respect to a particular virtual connection includes a cell filter for identifying cells belonging to the virtual connection. The "leaky bucket" algorithm is implemented for determining conformity with contractual performance standards, and for delineating the bursts.

28 Claims, 3 Drawing Sheets

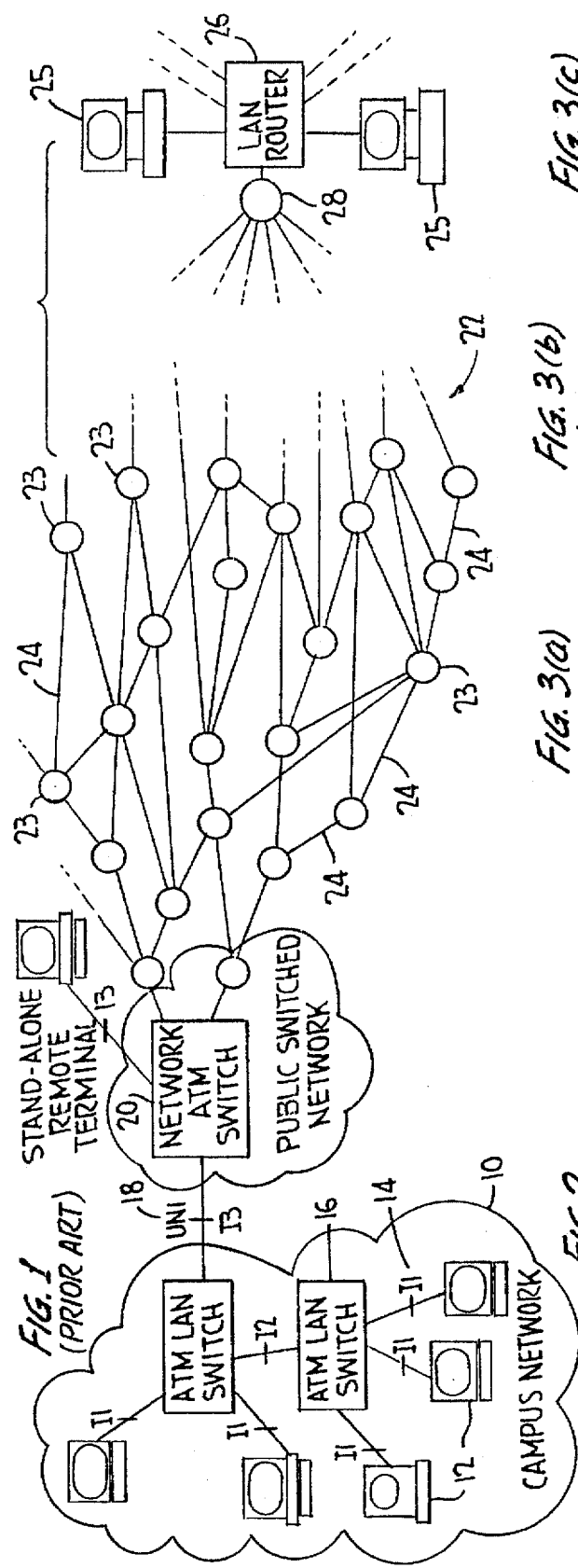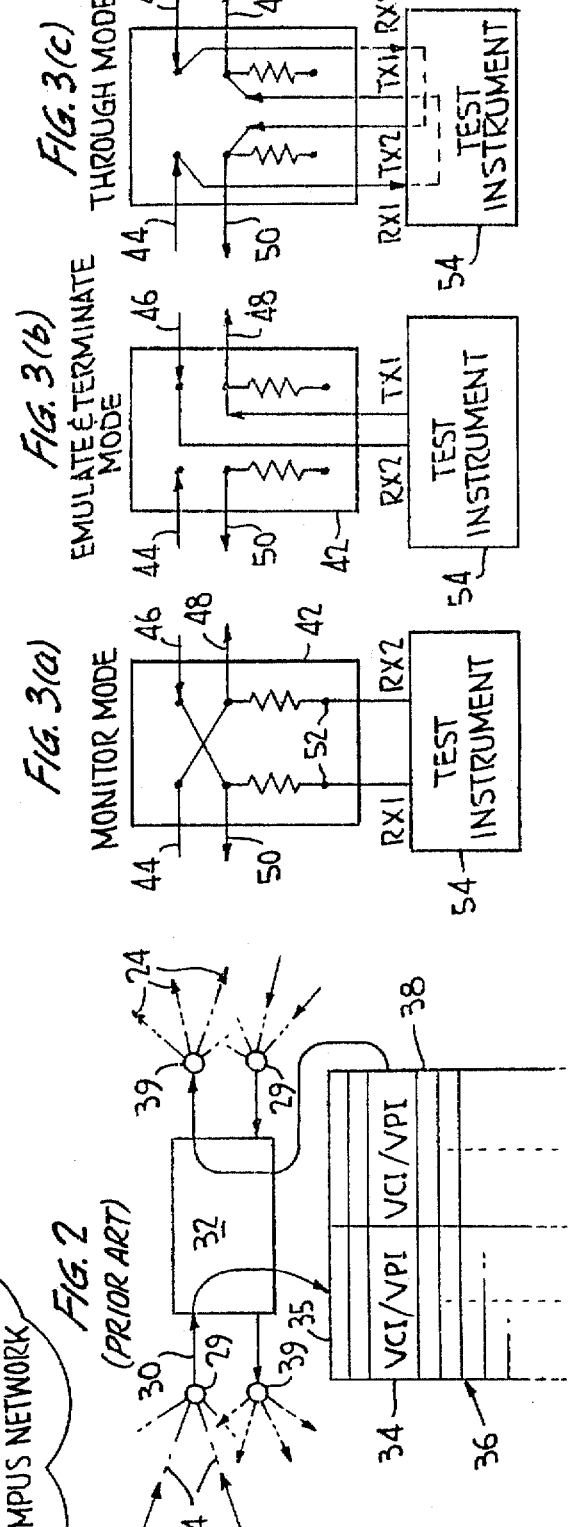

LEGEND:
GFC = GENERIC FLOW CONTROL          PTI = PAYLOAD TYPE IDENTIFIER
VPI = VIRTUAL PATH IDENTIFIER       CLP = CELL LOSS PRIORITY
VCI = VIRTUAL CHANNEL IDENTIFIER    HEC = HEADER ERROR CONTROL

LEGEND:
- ACCUMULATOR
- CELL RECEIVED

MEASURING BURST RATE AND BURST SIZE IN ATM NETWORK VIRTUAL CONNECTIONS

CROSS-REFERENCE TO RELATED APPLICATIONS

This application is one of four co-pending applications having generally related subject matter, that is, test instruments and methods for performing testing and measurement functions in ATM networks. The four applications are as follows:

Ser. No. 08/560,117, filed Nov. 17, 1995, for "Rate-Matched Cell Identification and Modification, Replacement, or Insertion for Test and Measurement of ATM Network Virtual Connections" Ser. No. 08/560,285, filed Nov. 17, 1995 for "Measuring Round Trip Time in ATM Network Virtual Connections" Ser. No. 08/560,552, filed Nov. 28, 1995 for "Statistics Collection for ATM Networks" Ser. No. 08/560,286, filed Nov. 17, 1995 for "Measuring Burst Rate and Burst Size in ATM Network Virtual Connections". The disclosures of the other three applications are incorporated herein by reference.

FIELD OF THE INVENTION

This invention relates to a test instrument and methods for measuring burst size and burst rate in variable bit rate ATM virtual connections as provided by ATM communication networks.

BACKGROUND OF THE INVENTION

With the increase in use of computing facilities throughout modern society, and in particular with increased communication over optical fiber-linked networks having far higher transmission speeds than previous conductive wire connections, there is substantial interest in new methods of communication. More particularly, previous communication tended to be segregated between voice and data communication, with different networks being provided for each. Typically voice communication took place over the telephone system, while high speed data communication took place over dedicated lines; data communication is also possible in the telephone system, but only at substantially slower rates than provided by dedicated lines. More recently, digital video and image communications have become of increased interest, particularly for so-called multimedia applications.

The result is that substantial improvements in flexibility of communication techniques are needed, in particular, to permit convenient future upgrading of communication facilities over time as additional data sources become available. Still more specifically, it is imperative that standards be developed and implemented allowing voice, video, images, and data to be transmitted more or less interchangeably over varying transmission media, such that equipment installed at a particular time will not soon be obsolete, but can continue to be used for communication as overall communication speeds are increased in the future.

These needs are largely expected to be met through broad implementation of so-called asynchronous transfer mode (ATM) communication networks. As distinguished from synchronous transfer mode (STM) communications, ATM allows the traffic rate from a particular source to be increased or decreased upon demand when communication is desirable. By comparison, in STM, a particular user is assigned particular synchronous transmission time slots on a particular communications medium, limiting the flexibility of the system. The significance of this distinction between asynchronous and synchronous transmission to the invention is discussed further below.

ATM networks are in the process of being installed in conformity with internationally-agreed upon standards for transmission of "cells" of data, including in "data" as used herein digitized voice communication, digitized images, and digitized video, as well as data per se. In ATM, all types of messages to be transmitted are divided into fixed length "cells", each cell including a header including cell payload type and routing information, and a fixed length "payload". The payload of each cell typically contains a relatively small portion of an overall message to be transmitted from a source to a destination. The ATM cells are transmitted by way of a source node into a network comprising a large number of switching nodes connected by communication links. Accordingly, an overall message to be transmitted from an originating source to an ultimate destination is divided into a number of cells, transmitted in sequence over a "virtual connection" established when the communication is established. Each cell transmitted as part of an ATM message transits the same virtual connection, that is, is routed through the same sequence of switching nodes and connecting links.

It is important in effective implementation of ATM networks that the specific type of communication links included in each virtual connection not be a constraint on the format of the ATM cell. That is, the cells of a particular ATM message may be transmitted by wire, by fiber optic cable, by satellite, or by combinations of these. The cell format itself remains unchanged. In this way, flexibility of the network configuration and implementation of future faster communications media can be provided without, for example, rendering obsolete the equipment used to generate cells from messages to be transmitted.

By comparison, according to another modern day communication technology, data is commonly transmitted in the so-called "frame relay" mode, wherein each "packet" transmitted includes the entire message. Hence each packet is of different length. In frame relay transmissions, the packet of data corresponding to the message is preceded by a single header, such that the entire message is transmitted in one long burst over a predetermined route through a series of nodes from a source node to a destination node. This system remains workable, but is relatively inflexible as traffic needs change from time to time. Further, frame relay transmission is best suited for communication of data per se, which tends to be "bursty". Voice and video communication have different intrinsic requirements.

More specifically, communication of data per se is typically time-insensitive, in that some time delay, and considerable variation in the time delay experienced by successive messages or segments of messages, between the time of transmission and the time of reception does not interfere with utility of communication. Voice and video transmissions are by comparison very sensitive to transmission time, in that all portions of the message must be received at a rate closely proportional to the rate at which they are transmitted, if important information is not to be lost. Variation in the delay between segments of a voice or video transmission is particularly disturbing to the receiving party.

In ATM, as noted, messages are divided into relatively small cells which are individually transmitted. For example, a voice communication may be transmitted in cells each effectively encoding single words, or even single syllables. The ATM format allows the individual cells of the message to be transmitted relatively instantaneously, such that they can be reassembled and delivered to a listener or viewer at the destination without perceptible delay. More specifically, because each message is transmitted over its own virtual connection, set up only after determination that the nodes involved have sufficient bandwidth to accommodate the anticipated cell rate, overloads can be avoided and the cell delay minimized.

It therefore will be appreciated that, in essence, an ATM communication involves setting up a virtual connection identifying a sequence of nodes extending between a source and a destination, and dividing the message into cells of equal length. The cells of the message are subsequently transmitted over the virtual connection, which may include each or all of wire conductors, optical links, or satellite relay links. At the ultimate destination, the headers of the cells are removed, the payloads are reassembled, returned to analog format when appropriate (e.g., in voice communication), and delivered to the user.

The basic format of the fixed-length ATM cell (a "cell" corresponding generally to a "packet" as that term is usually used), includes a header consisting of five eight-bit bytes (or "octets"), these including cell payload type and routing information, followed by 48 bytes of payload. Various standards organizations have agreed on the format of the header and the overall cell structure. See, for example, "ATM Pocket Guide", a publication of Tekelec of Calabasas, Calif. As shown therein, and as reproduced by FIG. 4 hereof, the ATM header of each cell includes at least 24 total bits of routing information, comprising 8 bits of "virtual path identifier" (VPI) information and 16 bits of "virtual channel identifier" (VCI) information.

In transmission of ATM cells, the VPI and VCI routing information in each cell header is updated at each node, responsive to predetermined information stored by each node at call origination. The VPI and VCI information stored in each cell at any given time is used by each node to route the cell to the next node in the series of nodes making up the virtual connection, as established at call origination.

More specifically, unlike a frame relay transmission, wherein the header information is unchanged as the packet transits the entire route from its originating source to its ultimate destination, in ATM transmissions, the VPI and VCI routing information in the header of each cell is updated as each intermediate node is transited.

As noted, each cell of any given ATM message transits the same virtual connection, that is, the same sequence of nodes. As part of the call origination process, information is stored at each node in the virtual connection, providing VPI and VCI information used to identify each incoming cell and update its VPI and VCI, so that the cell is properly switched to its next destination node in the virtual connection. Thus, as each cell is received at a node, its individual VPI and VCI information is examined by the node, and stored VPI and VCI information needed to convey that cell to the next node is used to update the header accordingly. It will therefore be appreciated that each node in an ATM network includes means for examining the header of each cell received and updating the VPI and VCI information accordingly.

The call origination process in ATM is well defined and need not be detailed here except to mention that when a call is originated, a series of "signaling" messages are passed back and forth between the originating source node, the intermediate nodes, and the ultimate destination node. The call origination process involves the sending of a message of predetermined format, indicating the relevant cell parameters such as the total number of cells to be transmitted, and their anticipated rate of supply. Each node which receives this call set-up message considers the requirements of the call, e.g., the anticipated cell density, and the like, to determine whether it has bandwidth—that is, communications capability—sufficient to handle the anticipated number of cells. During this process each of the intermediate nodes ultimately forming part of the virtual connection to be thus established must in effect agree to the traffic requirements anticipated, and must store sufficient information to allow updating of the VPI and VCI as the cells of that message transit that particular node.

ATM Traffic Flow Control

Depending on the expected traffic load, ATM users typically will agree with a service provider to a "traffic contract", involving, for example, pre-agreed limitations on one or more of (1) the peak cell rate anticipated, that is, an upper bound on the maximum frequency at which the user expects to transmit cells, (2) the amount of cell delay variation that can be tolerated, that is, maximum variation permitted in the time of transmission of individual cells, (3) the sustained cell rate anticipated, that is, an upper bound on the average frequency at which the user agrees to transmit cells, and (4) maximum burst size, that is, an upper bound on the length of a burst of cells which are transmitted at the peak cell rate. Each or all of these parameters may apply, in accordance with the type of traffic anticipated. For example, where the user anticipates transmission of "bursty" data traffic, a variable bit rate service virtual connection is commonly required, and is typically characterized by all of the aforementioned traffic parameters. One or more of these parameters may be included in the signaling messages sent at call set-up time, for evaluation by the individual candidate nodes.

In order to control the flow of traffic and maximize the utilization of network resources, it is important to determine whether these parameters are met by both user and service provider. In order to assure compliance, the traffic source node must apply the traffic parameters to a "traffic shaping" circuit which throttles the transmission of user cells in accordance with the specified parameters. Similarly, within the entrance node of the wide area network, the service provider may implement a "traffic policing" circuit which enforces the limits on the frequency and burst size of user cell transmission, increasing the cell loss priority or discarding cells that exceed the limits (so-called nonconforming cells), as specified by the traffic contract parameters.

More specifically, "burst rate" and "burst size" measurements are useful in assuring that a service user has not oversubscribed or undersubscribed his virtual connection. These measurements are also useful to service providers in statistical calculations used to determine how much network throughput beyond the limits of the network can be sold to subscribers. More specifically, buffer memories are provided within the network nodes to absorb excess throughput for short periods of time; given the knowledge of the "burstiness" of subscriber virtual connections, a statistical analysis may be performed to ensure that the buffer memories can absorb the excess throughput without dropping an excessive number of cells. The prior art does not teach test instruments suitable for measuring burst size and burst rate in ATM communication networks.

The burst size is defined as the number of cells belonging to a particular virtual connection received during a burst, while the burst rate is the number of cells in the burst divided by the total number of cell slots in the burst. That is, the burst rate is the number of cells divided by the temporal duration of the burst measured in cell slots, i.e., the total number of time intervals during which a cell might be transmitted. These parameters are commonly measured using a "leaky bucket" algorithm, more formally referred to as the "Generic Cell Rate Algorithm" (GCRA), which defines the beginning and end of a burst. Briefly, according to this algorithm, a burst is defined to commence when a cell is received at a time when an accumulator storing an integer value contains a zero value, that is, when the "bucket" is empty. Whenever a cell belonging to the virtual connection is received, the content of the accumulator is incremented by a fixed integer value; as time slots pass without cells being received, the "bucket" "leaks", i.e., the accumulator is decremented. The burst is defined to continue until the bucket is again emptied. U.S. Pat. 5,339,332 to Kammerl discloses circuitry for monitoring the bit rate in ATM networks using a known dual leaky bucket algorithm for the purposes of usage parameter control. Foglar et al U.S. Pat. 5,402,426 shows circuitry for monitoring bit rates of successive cells belonging to plural virtual connections, also using the "leaky bucket" algorithm, employing parameters comprised by a node in response to identification of the virtual connection to which a cell belongs. Neither Foglar nor Kammerl teach test instruments for measuring burst size or burst rate.

OBJECTS OF THE INVENTION

It is therefore an object of the invention to provide a test instrument and method for measuring burst size and burst rate in ATM virtual connections, that is, for monitoring the "burstiness" of traffic on one or more virtual connections, to determine whether service is being provided and used as contracted for.

It is a more specific object of the invention to provide a test instrument and methods for identifying the virtual connections of cells passing through the nodes of the network, and for calculating the size and rate of bursts thereof according to industry-standard algorithms, for example, to monitor conformity to service agreements.

SUMMARY OF THE INVENTION

The above objects of the invention and others which will appear as the discussion below proceeds are provided by the present invention, according to which a test instrument connects to a node of an ATM network. Such a node may be an originating source or ultimate destination node, typically termed a gateway node, or may be an intermediate node.

The instrument of the invention comprises a test processor adapted to monitor ATM traffic through a node of an ATM network. The instrument comprises a cell filter for identifying cells transiting the node by examination of the VPI and VCI fields of the header of each cell. Identification of the virtual connection of a given cell is used as input to a processor carrying out the "leaky bucket" algorithm.

A test instrument containing the invention may be operated to monitor the identified cells of a specified virtual connection for conformance to the "traffic contract parameters" which are specified for use according to the Generic Cell Rate Algorithm (GCRA), i.e., the "leaky bucket" algorithm as above. Burst rate and burst size measurements may be made by additional processing of the information that is collected to perform the GCRA. Further according to the invention, where the traffic contract parameters for the specified virtual connection to be tested cannot otherwise be obtained, they may be estimated.

BRIEF DESCRIPTION OF THE DRAWINGS

The invention will be better understood if reference is made to the accompanying drawings, in which:

FIG. 1 shows a schematic overview of a network for ATM traffic communication;

FIG. 2 shows a schematic diagram of the mechanism whereby a node updates the VPI and VCI information of each ATM cell it processes;

FIG. 3, including FIGS. 3(a)–3(c), shows three possible methods of connecting a test instrument to a test access port of a network node;

DESCRIPTION OF THE PREFERRED EMBODIMENTS

Figure 4:
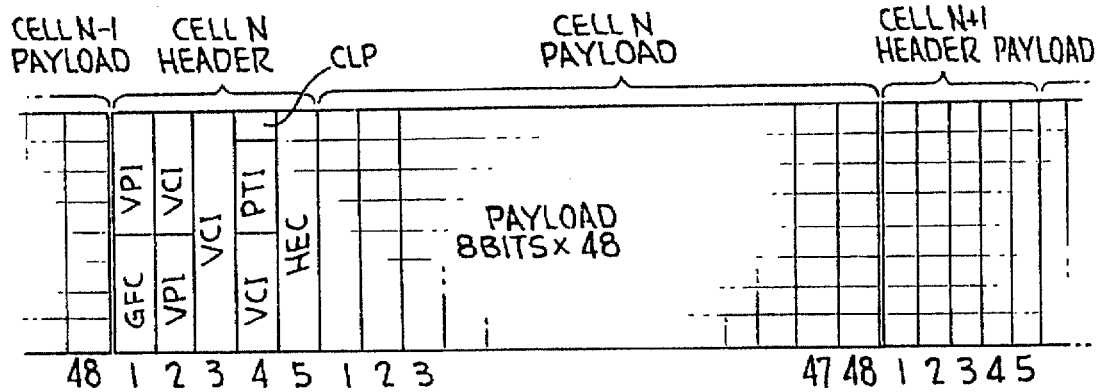
FIG. 4 shows schematically the layout of a typical ATM cell according to the standard format used in the industry.

As discussed above, the present invention relates to an instrument for measuring parameters of interest in an ATM communication network, specifically the burst size and burst rate of bursts of cells from one or more particular virtual connections of interest. Various related measurements may also be made; for example, the instrument of the invention may be employed to maintain records of the minimum and maximum burst rate and burst size measurements made, and the number of occurrences for each value of burst rate and burst size between the minimums and maximums.

The following provides certain additional information helpful in understanding the precise nature of the technical problems to be addressed by the invention, prior to discussion of the manner in which the invention resolves these problems.

As indicated above, asynchronous transfer mode (ATM) transmission of data (including in "data" voice, images, and video, digitized as necessary, as well as data per se) involves the segmenting of all messages to be transmitted into equal-length "cells" that are time-multiplexed over a communication link (i.e., cells from plural sources are transmitted in "cell slots" as available) at a source. Each cell of a given message is transmitted over the same sequence of nodes and links, termed a "virtual connection", to the destination of the particular message. The virtual connection is established at a call setup time wherein the originating source node sends out a first message including information as to the bandwidth required for transmission of the message, including, for example, the peak cell rate (PCR), the maximum rate at which cells will be transmitted. Candidate intermediate nodes then determine whether they can satisfy the bandwidth requirements of the traffic, and may negotiate these parameters if necessary. Ultimately, a virtual connection is established by storing next-node destination information in content-addressable memories (CAMs) or other circuitry comprised by each of the nodes; that is, VPI and VCI information pertaining to each segment of the virtual connection of which a given node is a component is stored at call origination, such that the routing information of each cell is updated as it passes through each of the nodes included in the virtual connection.

As the individual cells of a particular message transit the network, they may be multiplexed several times, e.g., from a relatively low speed local area network into a much higher speed wide area network. The links connecting the nodes may include conductive wires, optical fibers, and/or satellite transmission links. The streams of cells received at the ultimate destination nodes are demultiplexed and presented to the users connected to the ultimate destination node. Because each of the cells of a particular message transits the same sequence of nodes making up the virtual connection, each of the cells should arrive in its proper order. However, commonly the ultimate destination node will assemble the various cells of the message in a buffer, and strip off the header information and other non-message components of the cells, such that the entire message can be accessed in a single operation.

The object of the invention is to measure the burst rate and burst size with respect to particular virtual connections, e.g., for comparison to contracted traffic parameters. More particularly, as discussed generally above, service providers typically contract with users for service conforming to their individual needs. For example, banks may require relatively voluminous data transfers, but may be able to schedule these for late in the evening when traffic is light and rates are low. Banks also require very reliable data transmission and thus may contract for very high data integrity, that is, minimal cell error ratio. By comparison, ATM voice communications, e.g., between the head office of an organization and its field offices, does not require especially high integrity; considerable data losses are acceptable in voice communication without losing the sense of the message. However, peak voice traffic loads typically occur during the day. Further, avoidance of excessive or inconsistent cell delay is essential in voice communication. Nuances of meaning are communicated by the timing of words, for example. Inconsistent delays are found by users to be very irritating. Accordingly, in order to determine whether the service being provided meets the contracted-for standards, the various traffic contract parameters must be measured in a way conforming to the definition thereof given in the contract.

For variable bit rate connections, a maximum burst size is normally specified by reference to a known "leaky bucket" or generic cell rate algorithm, discussed in detail below. The information gathered to implement the leaky bucket algorithm can also be used for measuring the length of each burst of cells, and the rate of transmission of the cells during the burst for a virtual connection. In order to determine whether the burst size and burst rate conform to the traffic contract, the test instrument containing the invention must accordingly be able to implement the "leaky bucket" algorithm.

Topology of an ATM network

FIG. 1 shows in schematic form the overall arrangement of an ATM network, exemplified by the connection of a local area network 10, that is, a number of individual computers 12 interconnected by well-known local area network hardware, to a wide area ATM network indicated generally at 22. For example, a local area network 10 may exist on a college campus or the like, as indicated. The local area network (LAN) comprises a number of individual computers 12 each connected by LAN interface units 14 to ATM LAN switches 16. The ATM LAN switches 16 provide communication between computers 12 of the LAN 10, and also identify cells intended for destinations outside the LAN 10 and convert these to ATM cells, a process which will be detailed further below. LAN 10 is connected by an ATM user network interface 18 to wide area network 22 by way of an ATM switch 20. Network ATM switch 20 is thus a "gateway" node to the wide area ATM network 22. Network 22 comprises a large number of intermediate nodes 23 connected by a large number of links 24. ATM traffic may also be originated by digital telephone equipment, video conference equipment, or other known devices.

As indicated above, various nodes 23 transmit at differing transmission rates and are connected by correspondingly-varied media, i.e., links 24. Low speed nodes may be connected by wire conductors; more commonly, and especially in new installations, optical fibers are being used to connect high speed nodes so as to enable very high speed data transmissions from point to point. Satellite links may also connect various nodes.

As noted above, as a rule, an overall message to be transmitted over the ATM network, which may be a few seconds of digitized voice or video, or data per se, is divided into a large number of cells of identical format. The individual cells are generated by an ATM switch serving as a gateway node 20. Each cell is provided with initial VPI and VCI information at the gateway node, which is used to direct it to the first intermediate node in its virtual connection. As the cells transit the wide area network 22, their VPI and VCI information is updated at each node 23 until the cells reach a similar network ATM switch serving as a destination node 28 connected to the ultimate destination of a particular message. The ultimate destination may be a computer 25, similarly part of a local area network by virtue of being connected to a LAN router 26, in turn connected to destination node 28. As indicated, the structure and operation of the ATM network is well known and is defined by a variety of different standards describing the interfaces between the various classes of nodes, links, LANs, and other components involved.

FIG. 2 shows schematically the updating of each cell at each node in a normal ATM connection. Cells arriving on an incoming line 30 reach the node 32. More specifically, streams of incoming cells are received over a plurality of links 24, and are multiplexed by a switch 29 to provide a single stream of cells via line 30 to each node 32. Each incoming stream of cells will typically include cells from a number of virtual connections. As discussed above, and in further detail below, each ATM cell includes a 5-byte header, including VPI and VCI routing information identifying the next node in the virtual connection established for the cells of each message.

The VPI and VCI of the incoming cells, shown schematically at 34, are supplied to the comparand register 35 of (typically) a content-addressable memory (CAM) 36. When correspondence between the VPI and VCI of the incoming cell and the contents of the CAM 36 is detected, the CAM outputs updated VPI and VCI routing information from data stored at 38 at call set-up with respect to each virtual connection. The new VPI and VCI then become part of the header of the outgoing cell, and are used to similarly identify the cell at the next node. A multiplexing switch 39 forming the connection of each node to a plurality of outgoing links 24 is controlled such that each cell is transmitted over the correct link to reach the next node in the virtual connection.

Thus, as discussed above, at each node in a virtual connection, the VPI and VCI of the incoming message are updated to indicate the next node in the network to which that particular cell is to be transmitted. The correspondence between the "incoming" and "outgoing" VPI and VCI information is established at call origination and stored in each node forming part of a virtual connection established for each message by exchange of a sequence of call set-up messages between an ultimate source node and an ultimate destination node. While the capability of updating the VPI and VCI routing information of each cell at each node can be provided using other circuit components, currently-preferred node designs typically use CAMs in each node to provide the VPI and VCI updating at very high speed. Nodes having this capability are within the skill of the art as of the time of filing of this application. See U.S. Pat. 5,414,701 to Shtayer and 5,422,838 to Lin.

In the embodiment shown, the nodes themselves each comprise routing intelligence, that is, for responding to call set-up messages to establish virtual connections. However, the invention would also be useful in evaluating a network designed such that one or more central routers determined the sequence of nodes and links to be traversed by the cells of each message, i.e., to define the virtual connections.

Methods of Test Access

FIGS. 3(a)–3(c) show three different methods whereby a test instrument according to the invention can be connected to a conventional preexisting node 42 of an ATM network, using, in this example, electrical wire connections. As shown, node 42 is connected to two incoming lines 44 and 46 and two corresponding outgoing lines 48 and 50, respectively. As shown in FIG. 3(a), the test instrument 54 may be connected to two test port terminals 52 in a "monitor" mode of operation of the test instrument of the invention. In this mode, network service is undisturbed; the test instrument simply monitors traffic through the node and may perform various tests, maintain network operation statistics, and the like, without affecting flow of traffic.

In an "emulate and terminate" mode shown in FIG. 3(b), the test instrument effectively terminates incoming line 46 and originates traffic over transmit line 48. In this mode of operation, the test instrument effectively takes the node out of service.

Finally, in a third "through" mode, shown in FIG. 3(c), the test instrument is interposed in the traffic path between the incoming lines 44 and 46 and the corresponding outgoing lines 48 and 50.

The test instrument of the invention is capable of performing burst rate and burst size measurements in each of these test access modes.

Note that networks linked by high speed fiber optic lines may be accessed in a conceptually similar way, although there are no currently standardized methods for providing test access to nodes in fiber optic networks.

In each of FIGS. 3(a)–3(c), and below, the ports at which the test instrument 54 receives traffic from the node are labeled RX1 and RX2, while the ports through which the test instrument transmits data back to the node for transmission over the network are referred to as TX1 and TX2.

Format of an ATM Cell

FIG. 4 shows the format of the typical ATM user cell. As discussed above, each ATM cell includes 53 8-bit bytes, that is, includes a 5-byte header and 48 bytes of payload. The payload may contain user data in the case of normal user cells, or control information in the case of operations, administration, and maintenance (OAM) or resource management (RM) cells. The individual cells in a stream of cells may be separated by additional cell delineation bytes of predetermined format (not shown), depending on the precise medium of transmission being employed.

Within a LAN, and at the ATM User Network Interface (UNI) 18 (FIG. 1), the first byte of the header includes four bits of generic flow control (GFC) information, followed by four bits of virtual path identifier (VPI) information. Within the wide area network, the GFC bits are typically replaced with four additional VPI bits. VPI information also makes up the first four bits of the second byte, which is followed by four bits of virtual channel identifier (VCI) information. All eight bits of the third byte of the header include VCI, as do the first four bits of the fourth byte. The 24 (or 28) total bits of VPI and VCI together comprise routing information for the cell. Where the cell is an unassigned or idle cell, the VPI and VCI bits are all set to zero. The fifth, sixth, and seventh bits of the fourth byte of the cell header are payload type identifier (PTI) bits, which typically indicate whether the payload of the cell includes user data, whether the segments of the network through which the cell has traveled have experienced congestion and the like, or whether the cell is a "OAM" cell, used for control of network operation, administration, and maintenance. The last bit of the fourth byte is a cell loss priority (CLP) bit, a "1" indicating that the cell is subject to discard in the event of network congestion or the like. Where the VPI and VCI fields are all zeroes, the CLP bit differentiates between idle and unassigned cells. Finally, the fifth byte of the header includes header error control (HEC) data used to reconstruct the header if a single bit error is detected within the cell header by any of the nodes along a virtual connection.

Again, as discussed above, the VPI and VCI information included in the header of each ATM cell is updated at each node as the cell transits its virtual connection from its originating source node to its ultimate destination node. More specifically, each node stores VPI and VCI information corresponding to each virtual connection then being supported. When the sequence of nodes making up the virtual connection is determined at call origination, the VPI and VCI information of the incoming cells is stored by each node in association with the corresponding VPI and VCI information to be written into the header of each cell, so as to update the network routing information of each cell as each node is transited.

Contrasting Switched and Permanent Virtual Connections

The VPI and VCI information is normally arbitrary, in that it cannot be analyzed to identify the ultimate source of the cells, to identify the position of a cell in a sequence of cells, or the like. The VPI and VCI information also does not include a virtual connection identifier per se. However, it will be appreciated by those of skill in the art that certain VPI and VCI values are "reserved", e.g., for call origination messages. Candidate nodes identify the reserved VPI and VCI of call origination messages in order to respond to the call set-up query, i.e., to determine whether they can serve as part of a proposed virtual connection. Certain "permanent" virtual connections (as opposed to "switched" virtual connections established at call origination, as described) may also be established by permanent VPI and VCI assignments. Further, individual service providers may employ parts of the VPI field to indicate levels of service and the like.

Test Instrument Functional Description

Figure 5:
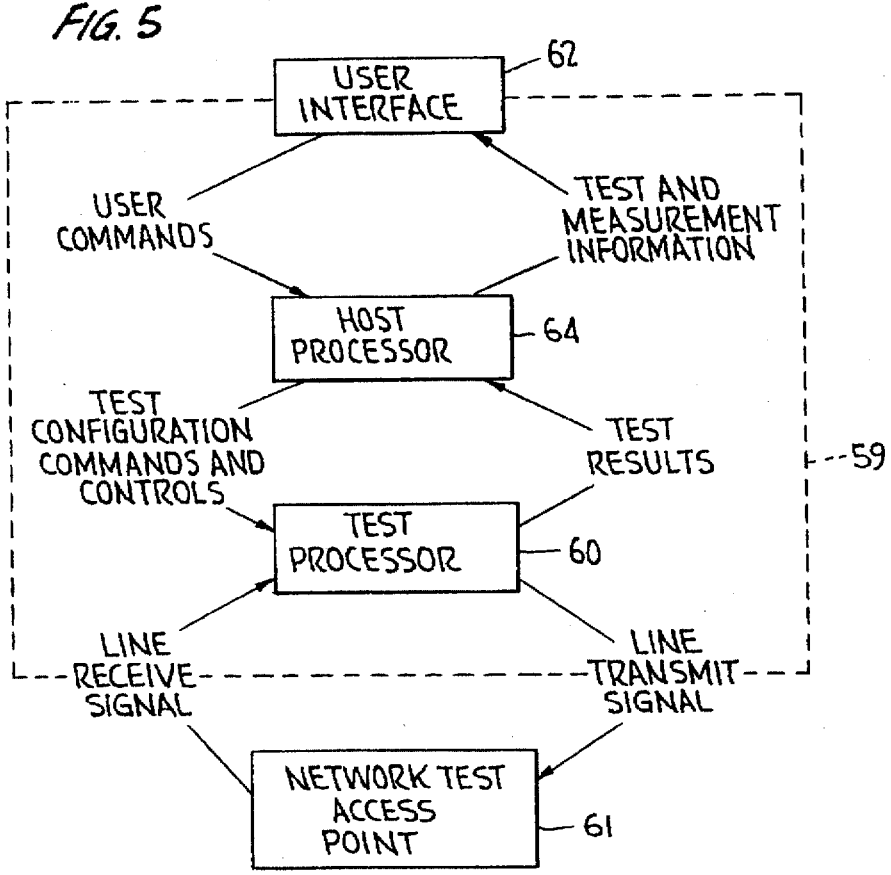
FIG. 5 shows schematically the components of a test instrument according to the invention.

FIG. 5 shows a block diagram of the principal components of a test instrument 59 for carrying out the functions provided according to the invention and indicates generally the flow of signals and data therebetween. The steps performed with respect to each cell in order to carry out the various tests provided according to the invention are performed by a test processor 60 implemented by a real-time embedded system. The principal functions of the embedded system relevant to the present invention are cell filtering, that is, identification of cells belonging to particular virtual connections, and determination of burst size and burst rate based thereon. The specific operations to be carried out by the test processor 60 are controlled by a user providing commands by way of a user interface 62 which is in turn connected to test processor 60 by a host processor 64. The host processor 64 may comprise a personal computer; the user is thereby provided with the ability to specify the type of test to be performed, and to identify specific virtual connections to be tested. The host processor also provides substantial processing capability with respect to test results and the like received from test processor 60. Test instruments including a user interface, a test processor, and a host processor are generally known; the invention in this case generally resides in the structure of the embedded system implementing the test processor 60 and the specific functions provided thereby.

In summary, the test processor 60 identifies specific cells in a stream of cells by comparison of the VPI and VCI fields of each cell to stored information. The stored information is typically provided by the user, who (for example) would key the information into the host processor 64 by way of a keyboard comprised by the user interface 62. The user in turn may obtain the VPI and VCI information from a system administrator, who assigns this information to each new virtual connection. The instrument may also store VPIs and VCIs received for a period of time, building a list of active connections. The user may then select one for analysis. A virtual connection may also be established specifically in order to test specific aspects of network operation, and the VPI and VCI then communicated to the user at the test instrument. According to the invention, the identified cells are monitored to measure burst size and burst rate.

Test Processor Block Diagram

Figure 6:
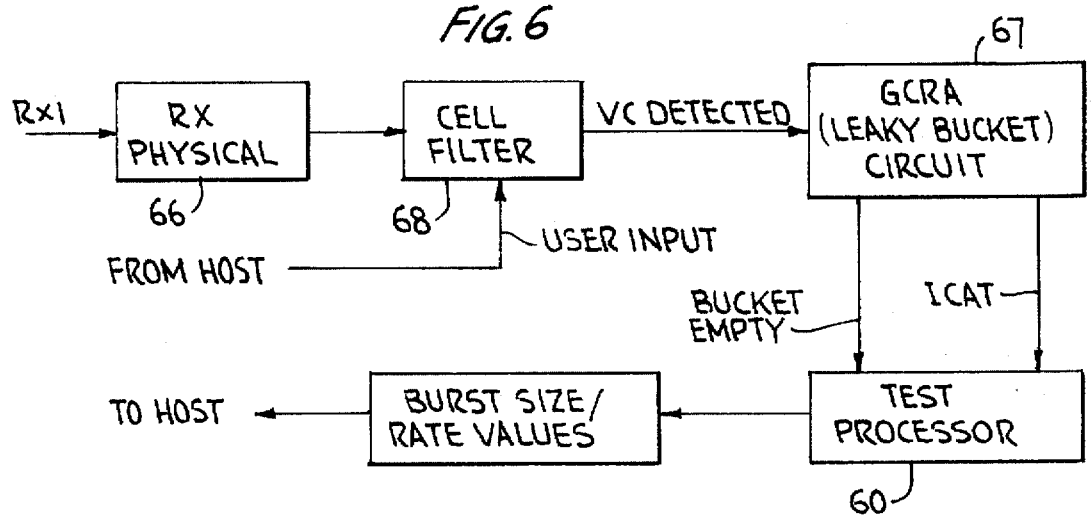
FIG. 6 is a block diagram of the principal components of a real-time embedded system implementing a test processor of the test instrument according to the invention.

FIG. 6 shows the principal components of the test processor 60. Incoming cells are received by a receiver 66 connected to a receive port RX1. The VPI and VCI fields of each cell are compared by a cell filter 68 to VPI and VCI information pertaining to a virtual connection of interest, as supplied by the user via the host processor 64 (FIG. 5).

In order to measure various characteristics of traffic between a particular source and a particular destination according to the invention, the cell filter 68 is supplied with VPI and VCI information corresponding to a virtual connection established therebetween and compared to that of incoming cells to locate those belonging to the particular virtual connection of interest. According to the present invention, the capability of identification of cells as belonging to specific virtual connections is employed to detect bursts of cells from a particular virtual connection, according to the leaky bucket algorithm, and monitored thereby to calculate their burst size and burst rate.

More specifically, a field-programmable gate array (FPGA) circuit 67 is employed to calculate burst size and burst rate responsive to detection of cells belonging to a particular virtual connection by cell filter 68. One or more virtual connections may thus be monitored, with FPGA 67 maintaining an accumulator for implementing the leaky bucket algorithm with respect to each.

Relation to Copending Applications

As noted above, this application is one of four directed to instruments for measuring various operational parameters in ATM networks. To clarify the relation of this application to the copending applications incorporated by reference above, according to the invention of copending Ser. No. 08/560, 117, cells identified by a cell filter as belonging to a particular virtual connection may be modified or replaced in the stream of cells by test cells. A multiplexer selects either the received cells or a test cell for transmission during each cell slot.

The particular operation to be performed is controlled responsive to user commands provided to host processor 64 (FIG. 5). For example, a time stamp may be added to the payload of the test cell for measurement of the round trip travel time of a test cell. See co-pending Ser. No. 08/560, 285.

The test instrument of the invention may also be employed for measuring various statistics of interest in monitoring network operations. See co-pending Ser. No. 08/563,552 for further details.

Returning to discussion of FIG. 6, cell filter 68 can be implemented in at least two ways. In both cases, the basic function of the cell filter is to compare stored VPI and VCI information, for example, representative of cells belonging to a particular virtual connection, to the VPI and VCI of each incoming cell. Where cells belonging to a single virtual connection need simply be identified, e.g., for measurement of the size and rate of bursts of cells from a particular virtual connection according to the present invention, the cell filter is preferably implemented as a set of exclusive-OR gates, as shown in further detail in copending Ser. No. 08/560,117. Where one or more characteristics of the cells are to be monitored, or where the rate and size of bursts of cell from more than one virtual connections are to be measured, a content-addressable memory (CAM) is the preferred implementation of the cell filter 68. See copending Ser. No. 08/563,552.

The OSI Seven Layer Model

The receiver 66 and transmitter 78 in FIG. 6 both perform functions usually termed part of the "physical layer" of a communication device. The "physical layer" nomenclature refers to the first layer of a seven-layer industry standard model of communications referred to as the "Open Systems Interconnection" (OSI) model. The OSI model and its relation to the present invention are discussed in detail in Ser. No. 08/560,117.

Measuring Burstiness

According to the present invention, tests are carried out to measure the size of bursts of cells and the burst rate of cells received from a particular source, that is, over a particular virtual connection. More specifically, certain traffic, especially data per se, tends to be "bursty" in that large numbers of cells are typically transmitted in a short period of time as a particular message is divided into cells and transmitted. An ATM service provider will normally agree to a maximum burst size to be supported with respect to a particular user, obliging the user to control the traffic such that the burst size does not exceed the maximum contracted for. In order to determine whether the traffic is being properly "shaped" according to the contract, the size of bursts of cells from a particular source and their burst rate must be measured.

According to the invention, as discussed above, cells from a particular source are identified by examination of the header information of each cell received by a particular node. The burst rate cannot simply be measured by counting the number of cells received from a particular source in a particular time period; this calculation would yield an average cell rate, and would not fully represent the "burstiness" of the traffic. What is instead required is a method for determining when a group of cells arrives from a particular source, that is, for identifying a burst, and monitoring the total number of cells arriving from that particular source during the burst. In effect, the requirement is to accurately measure the commencement of the burst and its end to measure its duration, and to count the number of cells from that virtual connection received during the burst.

The art is aware of a so-called "leaky bucket" algorithm (formally known as the Generic Cell Rate Algorithm (GCRA)) used to assure conformity of service and usage to contractual parameters. Circuits implementing the leaky bucket algorithm for use by nodes for traffic shaping and similar purposes are shown in the Kammerl and Foglar et al patents referred to above. This algorithm provides an art-recognized definition of the maximum length of bursts, and accordingly must be implemented by a test instrument monitoring burst size and burst rate for ensuring conformity to contractual parameters. Additional details of the GCRA are provided by the ATM Forum Technical Committee's User Network Interface Specification, Version 3.0.

Figure 7:
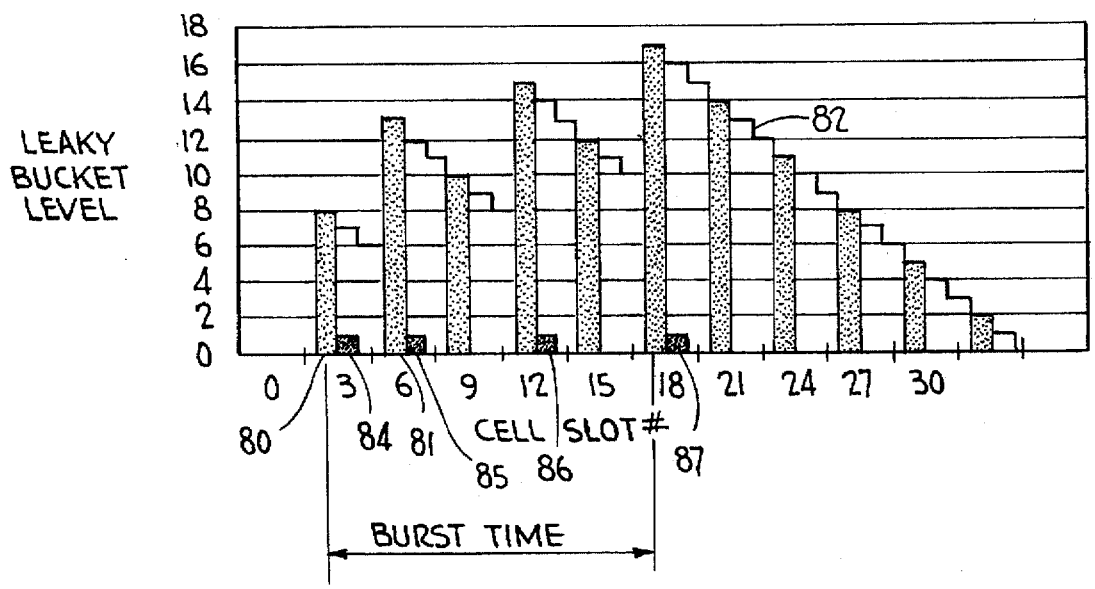
FIG. 7 shows schematically a diagram useful in understanding measurements performed according to the invention.

An example illustrating the use of the leaky bucket algorithm for delineating bursts is diagrammed in FIG. 7. Essentially, a burst is taken to have begun when a cell from a particular virtual connection is received at a time when the "bucket" is empty, that is, when an accumulator register corresponding to the bucket for that virtual connection contains a zero value. It will be apparent that an instrument for implementing the leaky bucket algorithm with respect to a particular virtual connection must be able to identify cells coming from a particular source by comparing cell header information to stored information. This ability is provided by the cell filter 68 of the instrument of the invention, which can be connected to a node anywhere within the ATM network for this purpose.

The cells are received by a physical-layer receiver 66, and are provided to cell filter 68, together with user input identifying the virtual connection of interest. Cell filter 68 compares the user input to the corresponding fields of each incoming cell. When cell filter 68 identifies a cell of interest, it provides a VC Detected signal to a GCRA circuit 67 implementing the leaky bucket algorithm. GCRA circuit 67 includes an arithmetic accumulator, and is conveniently implemented using a field-programmable gate array circuit connected to the cell filter 68 to receive the VC Detected signal (see FIG. 6). As discussed in detail below, GCRA circuit 67 provides Bucket Empty and Intercell Arrival Time (ICAT) signals to test processor 60. Test processor 60 calculates the burst size and rate values accordingly, as indicated at 69, for supply to the user via host processor 64. The results, that is, burst rate and burst size measurements, are provided to the user via the user interface 62 (FIG. 5).

The vertical bars, e.g., 80, 81, in the example of FIG. 7 show the value stored in the accumulator, that is, the "leaky bucket" level, as a function of time, measured by passage of cell slots. The vertical bars 80, 81, shown in FIG. 7 correspond to the value as measured during every third cell slot, for clarity, while line 82 shows the value stored in the accumulator throughout the burst. The value in the accumulator at any given time indicates the number of cell slots which must pass without detection of further cells before the burst will be deemed to be complete. The leaky bucket thus effectively contains a measure of time.

Cell arrivals are denoted by the small squares 84-87, in cell slots 3, 6, 12, and 18. In the example shown, a value of eight cell slots is added to the accumulator wherever the cell filter indicates a cell has been received from a particular source. This value of eight cell slots is known as the peak emission interval, and is the inverse of the contracted-for peak cell rate. In the example, the contract agreed to between service provider and user will thus have specified that not more than one cell per every eight cell slots will belong to the corresponding virtual connection. Thus, in cell slot 3, a first cell is received at 84 and the value of the accumulator goes up to eight as shown at 80. The burst is taken to have begun at this time.

According to a further aspect of the leaky bucket algorithm, a value of, for example, one cell slot is subtracted from the accumulator (the "bucket" "leaks") as time passes, i.e., a value of one is subtracted from the accumulator upon each passing cell slot. That is, the accumulator stores a measure of time; time is subtracted from the accumulator as time passes. Accordingly, after a second cell is received in cell slot six, as indicated at 85, the accumulator stores a value of 13, that is, (2×8)−3, corresponding to the three time slots between cell slots 3 and 6. No cells have been received when the accumulator total is next shown, at cell slot 9, when its value is 10. Another cell is received at 86, in cell slot 12, so the value of the accumulator then increases by a net change of 5 (+8−3=5), to a value of 15. No cells are received by cell slot 15, so the value of the accumulator is gradually reduced to 12. A further cell is received at 87, in cell slot 18; the accumulator then has a value of 17, which decreases gradually, by one per cell slot expired, until zero is reached at cell slot 36.

In this example, four cells are received in a burst lasting a total of 33 (36−3=33) cell slots. Accordingly, the burst size (BS) is four, the number of cells received, and the burst measurement time interval is 33 cell slots. The actual burst time (BT) is determined to be the number of cell slots elapsed between the receipt of the first and last cells of the burst, in this case, 15 (18−3=15) cell slots. More specifically, a time of detection is recorded with respect to corresponding portions of each cell belonging to the virtual connection of interest, and these are used to determine the burst time (BT) when the burst has ended, that is, when the accumulator reaches zero. The burst rate (BR) is calculated according to the relationship BR=(BS−1)/BT. In the example of FIG. 7, BR=(4−1)/15=3/15. This indicates a burst rate of 3 cells received in 15 cell slots, which can be numerically reduced to 1 cell every 5 cell slots.

It is useful to compare the measured burst size and burst rate with the traffic contracted maximum burst size and peak cell rate, respectively. In this example, the burst rate was 1 cell every 5 cell slots. As noted, the peak emission interval used in the algorithm is typically set equal to the maximum burst rate contracted for; in this case, the actual burst rate of 1 cell per 5 cell slots exceeded the agreed-upon peak cell rate of 1 cell every 8 cell slots, indicating that this parameter of the traffic contract has been exceeded. The GCRA tolerates this type of behavior, subject to a tolerance limit parameter which is beyond the scope of the present invention, but is further explained in the technical literature.

In order to determine whether the contractual provisions are being conformed to, the peak cell rate (PCR) and the sustained cell rate (SCR) need to be known or determined. These values can be input by the user into the test instrument, can be determined by monitoring the signaling messages exchanged at call set-up, or can be determined by consulting a database maintained by the node. PCR and SCR can also be estimated by measuring the intercell arrival times (ICAT) between receipt of successive cells belonging to a particular virtual connection. The peak ICAT is estimated by measuring a plurality of consecutive ICATs, identifying periods including bursts of cells as discussed above, removing ICAT measurements made during idle periods, and calculating the peak ICAT as the average of the remaining ICAT values. The peak cell rate PCR is then equal to 1 divided by the peak ICAT value. The sustained cell rate SCR is simply 1 divided by the average ICAT for all cells received belonging to the specified virtual connection. These calculated values can then be employed to set up the leaky bucket algorithm.

Stated differently, a contractual provision will normally set the peak cell rate (PCR) in cells per unit time, e.g., cells per second. This value is equivalent to a number of cells per cell slot, as a given number of cell slots are defined per second (this value varying with the type of transmission medium). The contract in the example given above specified a maximum cell rate of no more than 1 cell transmitted per 8 cell slots. The value 8, by which the accumulator is incremented upon receipt of each cell in the example, is thus equal to 1 divided by PCR. Bursts are identified by monitoring whether the accumulator implementing the leaky bucket algorithm for that particular virtual connection has a non-zero value. That is, a burst is considered to have begun when a cell from a particular virtual connection is detected at a time when the accumulator is empty. The burst ends when the accumulator, which is decremented as time passes, reaches zero. The accumulator at any given time stores a value of time proportional to the number of cells received, and effectively inversely proportional to the rate at which they were received. The burst ends when enough cell slots have passed without any further cells having been received from that particular virtual connection such that the leaky bucket is empty.

Conclusion

It will be apparent that the ability of the test instrument of the invention to detect cells from one or more particular virtual connections is critical to its utility in monitoring the burst size and burst rate. This ability is provided by the cell filter. Given the identification of the cells by the cell filter, design and programming of the field-programmable gate array circuit, or another processor device, such as a microprocessor, to implement the invention is within the skill of the art.

According to the invention, the "leaky bucket" algorithm is implemented in order to delineate cell bursts, which begin when a previously empty "bucket" first receives a cell, and end when the bucket becomes empty once again. The burst size and burst rate of cells transmitted by a particular variable bit rate virtual connection can then be readily determined; the burst size is the number of cells counted during the burst, and the burst rate is (burst size−1)/burst time.

While a preferred embodiment of the invention has been described in detail, and examples of its operation have been given, it will be appreciated by those of skill in the art that these are merely exemplary and that other implementations of various aspects of the invention are also within its scope and extent. The invention is therefore not to be limited by the above exemplary disclosure, but only by the following claims.

What is claimed is:

1. An instrument for measuring the size and rate of bursts of cells in an ATM communication network, each cell comprising a header portion including information corresponding to a virtual connection to which said cell belongs, and a payload portion, said instrument comprising:

means for connection to a pathway of a stream of cells flowing in said network, cell filter means for comparing at least a portion of said header portion of each cell to information identifying a virtual connection of interest, and for providing a first signal responsive to detection of a cell in a monitored stream of cells belonging to said virtual connection of interest, and means for monitoring said first signal as a function of time, to determine the size and rate of bursts of cells belonging to said virtual connection of interest.

2. The instrument of claim 1, wherein said means for monitoring said first signal as a function of time comprises means for implementing a leaky bucket algorithm for delineating burst of cells belonging to said virtual connection of interest.

3. The instrument of claim 2, wherein said means for implementing a leaky bucket algorithm comprises an accumulator for each virtual connection as to which the size and rate of bursts of cells is to be monitored, means for incrementing the value stored in each said accumulator by a first amount when a cell belonging to the corresponding virtual connection is detected, means for decrementing the value stored in each said accumulator by a second amount with the passage of successive predetermined periods of time, and means for determining when the value stored in said accumulator reaches zero.

4. The instrument of claim 3, wherein said predetermined periods of time are measured in cell slot intervals during which cells may be transmitted.

5. The instrument of claim 4, further comprising means for measuring the burst time BT as the number of cell slots between receipt of the first cell of the burst and the first subsequent cell slot during which the accumulator value is zero, means for measuring the burst size BS as the number of cells received during a burst, and means for calculating the burst rate BR according to the relation BR=(BS−1)/BT.

6. The instrument of claim 5, wherein a peak cell rate (PCR) is determined with respect to each virtual connection of interest, and said instrument further comprises means for comparing BR to PCR.

7. The instrument of claim 6, wherein said first amount is 1/PCR.

8. A method for measuring the size and rate of bursts of cells in an ATM communication network, each cell comprising a header portion including information corresponding to virtual connection to which said cell belongs, and a payload portion, said method comprising the steps of:

connecting a test instrument to a pathway of a stream of cells flowing in said network, said instrument comprising cell filter means;

supplying information identifying a virtual connection of interest to said instrument;

comparing at least a portion of said header portion of each cell to information identifying a virtual connection of interest to thereby identify cells belonging to said virtual connection of interest;

providing a first signal responsive to detection of a cell belonging to said virtual connection of interest; and monitoring said first signal as a function of time, to determine the size and rate of bursts of cells belonging to said virtual connection of interest.

9. The method of claim 8, wherein said step of monitoring said first signal as a function of time comprises implementing a leaky bucket algorithm for delineating bursts of cells belonging to said virtual connection of interest.

10. The method of claim 9, wherein said leaky bucket algorithm is implemented by:

providing an accumulator for each virtual connection as to which the size and rate of bursts of cells is to be monitored;

incrementing each said accumulator by a first amount when a cell belonging to the corresponding virtual connection is detected;

decrementing each said accumulator by a second amount upon passage of successive fixed periods of time; and determining when the value in each said accumulator reaches zero.

11. The method of claim 10, wherein said successive fixed periods of time are measured in cell slot intervals sufficient to transmit cells.

12. The method of claim 11, comprising the further steps of:

measuring the burst time BT as the number of cell slots between receipt of the first cell of the burst and the first subsequent cell slot during which the accumulator value is zero, measuring the burst size BS as the number of cells received during a burst, and calculating the burst rate BR according to the relation BR=(BS−1)/BT.

13. The method of claim 12, comprising the further steps of determining a peak cell rate (PCR) with respect to each virtual connection of interest, and comparing BR to PCR.

14. The method of claim 13, wherein said first amount is 1/PCR.

15. The method of claim 13, comprising the further steps of estimating the peak cell rate, by averaging the intercell arrival time (ICAT) between arrival of cells during a burst of cells belonging to a particular virtual connection, and determining PCR as 1/ICAT.

16. A method for measuring the size of bursts of cells with respect to a particular virtual connection established in an asynchronous transfer mode communications network, comprising the steps of:

connecting a test instrument to a portion of the traffic flow path through a node in said network;

operating said instrument to identify cells received at said node as a function of their respective virtual connection;

determining the peak cell rate (PCR) of the virtual connection to be tested;

monitoring the operation of an accumulator for measuring the time available for transmission of cells by the node with respect to that particular virtual connection, said accumulator implementing a cell rate control algorithm, according to which (1) 1/PCR seconds are added to the accumulator upon reception of each cell pertaining to a particular virtual connection, and (2) time is subtracted from a positive value stored in the accumulator as time elapses;

determining that a burst has begun with respect to the particular virtual connection being monitored when a cell from that virtual connection is received at a time when the accumulator is empty;

determining that a burst has ended when the value stored in the accumulator goes from a positive value to zero; and calculating the burst size (BS) as the number of cells counted during the burst as thus delineated.

17. The method of claim 16, wherein said cell rate control algorithm is a Generic Cell Rate Algorithm (GCRA).

18. The method of claim 17, comprising the further steps of recording a corresponding time of receipt for each cell received as part of a burst, and determining the burst time (BT) as the elapsed time between receipt of the first cell of a burst, and the last cell in said burst.

19. The method of claim 18, comprising the further steps of calculating the burst rate (BR) according to the relation BR=(BS−1)/BT.

20. The method of claim 16, comprising the further step of determining the peak cell rate (PCR) of the virtual connection to be tested by:

measuring the inter-cell arrival times (ICATs) between receipt of successive cells with respect to said virtual connection;

determining peak ICAT by:
(1) measuring a plurality of consecutive ICATs for periods including bursts of cells,
(2) removing ICAT measurements made during idle periods between bursts, and
(3) calculating peak ICAT as the average of the remaining ICAT values; and determining PCR according to the relation PCR=(1/peak ICAT).

21. The method of claim 16, comprising the further step of determining the sustained cell rate (SCR) of the virtual connection to be tested by:

measuring the inter-cell arrival times (ICATs) between receipt of successive cells with respect to said virtual connection;

calculating a running average of the measured ICATs; and determining SCR according to the relation SCR=(1/average ICAT).

22. The instrument of claim 16, wherein said PCR and SCR values are determined by reference to signaling messages exchanged over said network in order to establish said virtual connection to be tested.

23. An instrument for measuring the size of bursts of cells with respect to a particular virtual connection established in an asynchronous transfer mode communications network, comprising:

means for establishing connection to a portion of the traffic flow path through a node in said network;

means for identifying cells received at said node as a function of their respective virtual connection;

means for determining the peak cell rate (PCR) of the virtual connection to be tested;

accumulator means for monitoring time available for transmission of cells with respect to said virtual connection to be tested;

means for implementing a cell rate control algorithm, whereby (1) 1/PCR in units of time is added to a value stored by the accumulator means upon reception of each cell pertaining to a particular virtual connection; and (2) time slot is subtracted from any positive value stored in the accumulator means as time elapses;

means for determining that a burst has begun when a cell of a message to be transmitted by said virtual connection to be tested is received when the value stored by the accumulator means is zero;

means for determining that a burst has ended when the value stored in the accumulator means goes from a positive value to zero; and means for calculating the burst size (BS) as the number of cells counted during the burst as thus delineated.

24. The instrument of claim 23, further comprising means for recording corresponding times of receipt of each cell received of a burst, and determining the burst time (BT) as the time between receipt of the first cell of a burst, and receipt of the last cell in said burst.

25. The instrument of claim 24, further comprising means for calculating the burst rate (BR) according to the relation BR=(BS−1)/BT.

26. The instrument of claim 25, further comprising means for estimating the peak cell rate (PCR) of the virtual connection to be tested by:

measuring the inter-cell arrival times (ICATs) between receipt of successive cells with respect to said virtual connection;

determining peak ICAT by:

(1) measuring a plurality of consecutive ICATs for periods including bursts of cells, (2) removing ICAT measurements made during idle periods between burst, and (3) calculating peak ICAT as the average of the remaining ICAT values; and determining PCR according to the relation PCR=(1/peak ICAT).

27. The instrument of claim 23, further comprising means for determining the sustained cell rate (SCR) of the virtual connection to be tested by:

measuring the inter-cell arrival times (ICATs) between receipt of successive cells with respect to said virtual connection;

calculating a running average of the measured ICATs; and determining SCR according to the relation SCR=(1/average ICAT).

28. The instrument of claim 23, wherein said PCR and SCR values are determined by reference to the messages exchanged over said network in order to establish said virtual connection to be tested.

* * * * *